US005913908A

United States Patent [19]

Czipri

[11] Patent Number: 5,913,908

[45] Date of Patent: Jun. 22, 1999

[54] HATCH LATCH WITH INTEGRAL LOCK

[75] Inventor: John Czipri, Clearwater, Fla.

[73] Assignee: Accon Marine, Inc., Clearwater, Fla.

[21] Appl. No.: 08/845,451

[22] Filed: Apr. 25, 1997

Related U.S. Application Data

[63] Continuation of application No. 08/546,819, Oct. 23, 1995, abandoned.

[51] Int. Cl.[6] ..................... B60R 25/02

[52] U.S. Cl. ..................... 70/208; 70/210; 292/336.3

[58] Field of Search ..................... 70/208, 210, 125, 70/127, 360, 483–485; 292/DIG. 31, 336.3

[56] References Cited

U.S. PATENT DOCUMENTS

| | | | |
|---|---|---|---|
| 1,652,660 | 12/1927 | Devereaux | 70/210 |
| 2,772,809 | 12/1956 | Ross | 220/318 |
| 4,706,478 | 11/1987 | Swan et al. | 70/208 |
| 5,076,080 | 12/1991 | Fuss et al. | 70/125 |
| 5,107,643 | 4/1992 | Swensen | 52/202 |
| 5,409,272 | 4/1995 | McCormack | 292/66 |

*Primary Examiner*—Steven N. Meyers
*Assistant Examiner*—Tuyet-Phuong Pham
*Attorney, Agent, or Firm*—Harold D. Shall

[57] ABSTRACT

A waterproof hatch latch with a lifting ring for mounting in a hatch cover with the lift ring connected to a cam member disposed in the latch housing. The cam member carries a locking bar on its inner end which is engagable with the adjourning deck to lock the hatch. A waterproof lock tumbler is mounted in the latch housing and a slide plate connects the tumbler to the cam member to lock the lock bar in its position engaging the deck and to lock it in position one hundred eighty degrees removed from engagement. A spring is disposed in the mounting between the cam member and the housing to prevent damage to the lift ring.

4 Claims, 3 Drawing Sheets

HATCH LATCH WITH INTEGRAL LOCK

This application is a continuation of application Ser. No. 08/546,819, filed Oct. 23, 1995, now abandoned.

BACKGROUND OF THE INVENTION

1. Field of the Invention

This invention relates to a hatch latches generally and more particularly to waterproof hatch latches with an integral lock and father to such latter hatch latches which include impact springs to inhibit breakage of the lift ring.

2. Description of Prior Art

Waterproof lockable hatch latches are known in the prior art, such as the Lockable Hatch Latch of U.S. Pat. No. 5,076,080, which latch comprise in a single assembly a lift ring for raising a hatch, a latch operated by the life ring for latching the hatch and a locking mechanism in the assembly for locking the latch in its hatch locking position. However, the operation of the device of this patent and of other prior art patents is very complex and the latch of U.S. Pat. No. 5,076,080 can only be locked in its latching position and is not lockable in its unlatched position. Further, there is no feature to limit the exposure to damage of the lift ring itself.

SUMMARY OF THE INVENTION

An object of this invention is to provide a hatch latch having an integral lift ring and an integral lock which is sealed so that water cannot leak therepast.

It is another object of this invention to provide such a hatch latch which is simple to operate and has a simple structure yet is compact and durable.

It is a further object of this invention to provide such a hatch latch which can be locked in both its latched and unlatched position.

Yet another object of this invention is to provide such a hatch latch which includes a resilient means to inhibit damage to the lift ring portion in the event it is not placed in a flush position.

Still another object of this invention is to provide such a hatch latch wherein the key operated tumbler actuates an eccentric pin which in turn moves a slide with a slot therein between a locked and an unlocked position and wherein in the lock position the slide engages the sides of a cam shaft, the latter moving a locking bar into and out of its locking position, and in its unlocked position the slide does not engage the sides of the cam shaft whereby the cam shaft is free to be rotated by the lift ring and thereby move the locking bar to its locked position or from its locked position to its unlocked position.

Other and further objects of this invention will become apparent from a review of the drawings and the following specification and claims.

DETAILED DESCRIPTION OF THE PREFERRED EMBODIMENT

Figure 1:
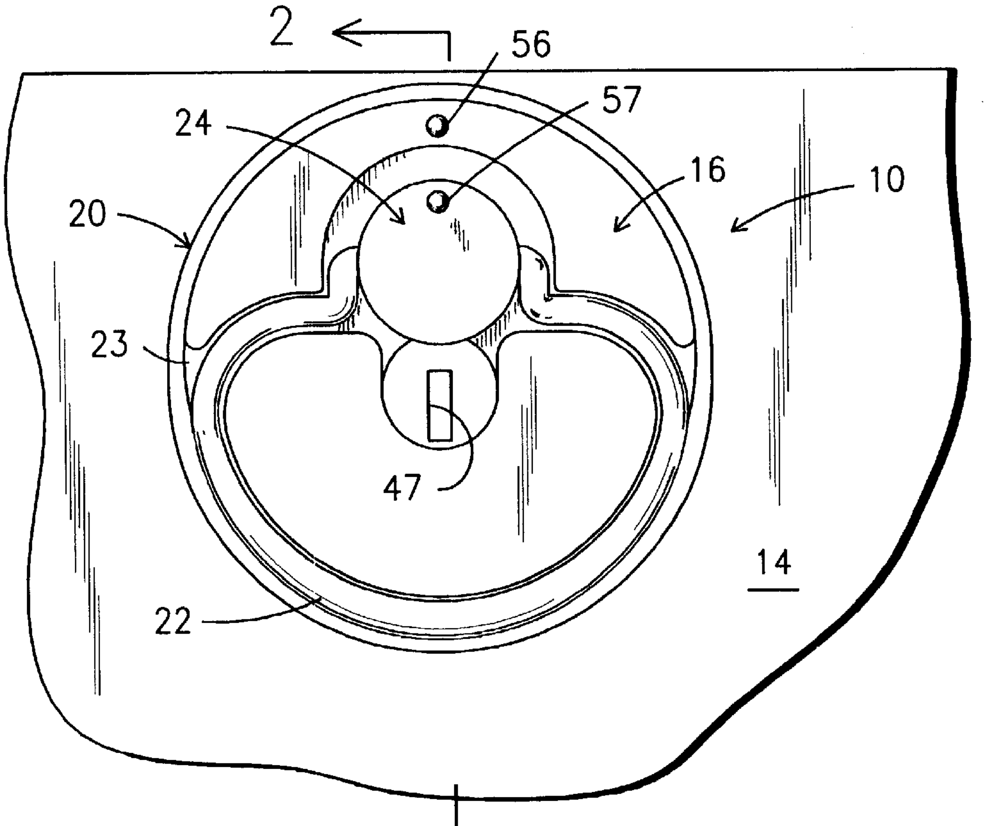
FIG. 1 is a plan view, of a hatch latch according to this invention mounted in a hatch cover shown fragmentarily.
Figure 2:
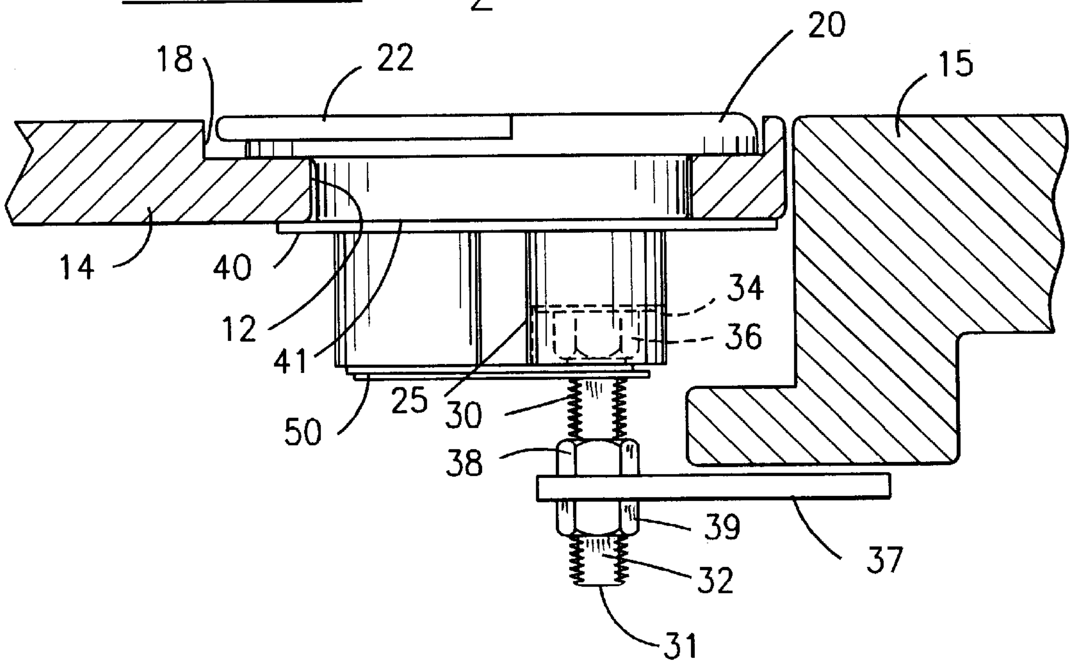
FIG. 2 is a cross sectional view taken along the line 2—2 in FIG. 1 also showing a portion of the deck adjacent the hatch cover, some portions of the latch being shown in full.

Referring now to the drawings and more particularly FIGS. 1–7, a hatch latch with integral lock is shown generally at 10 suitably mounted in an opening 12 of a hatch cover 14. The latch 10 includes a housing 16 which is snugly and sealingly received in the opening 12 and bedded therein by the usual bedding compound, so that water may not leak therepast. The opening 12 is counter-sunk at 18 so that a top flange 20 of the housing 16 can be received therein. A generally "C" shaped lift ring 22, when in its "down" position, fits in a conformingly shaped groove 23 formed in the top of the housing 16, so that, as seen in FIG. 2, when the ring 22 is in the groove 23, it is flush with the top of the housing 16. A knob shown generally at 24 is formed on the top of a knob shaft 25, which knob 24 has a pair of diametrically opposed openings therein, one of which is shown at 26, which openings pivotally receive the opposed ends of the "C" shaped ring 22, whereby the ring 22 can be pivotally upwardly into a graspable position and downwardly into a flush position relative to the housing 16. When in its upward position, the ring can be pulled on to raise the hatch 14 relative to the deck 15 and also to rotate the knob 24 to "latch" or "unlatch" the hatch latch.

Figure 3:
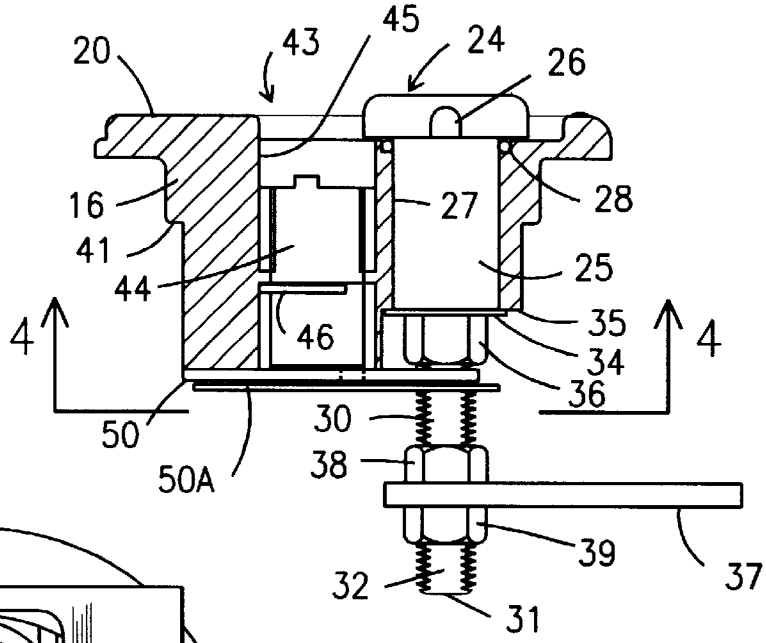
FIG. 3. is a further sectional view of the hatch latch of FIG. 2 with the latch housing shown in section and the remainder of the latch shown in full lines.
Figure 4:
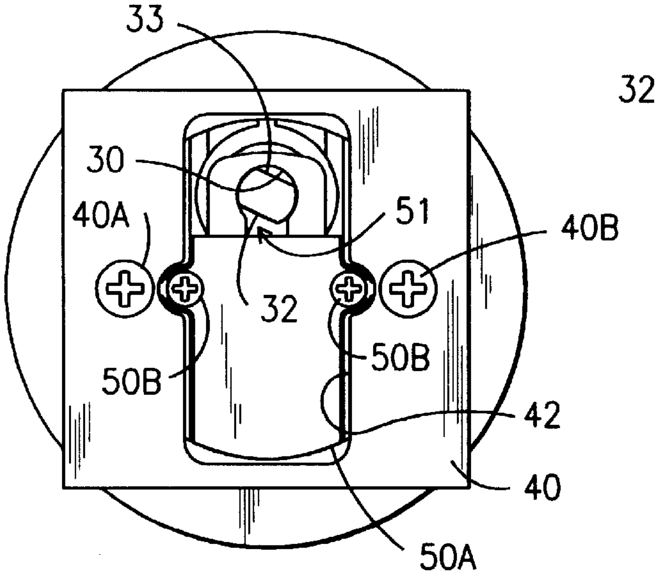
FIG. 4. is a bottom view of the hatch latch in its unlocked position taken along the lines of 4—4 in FIG. 3.
Figure 5:
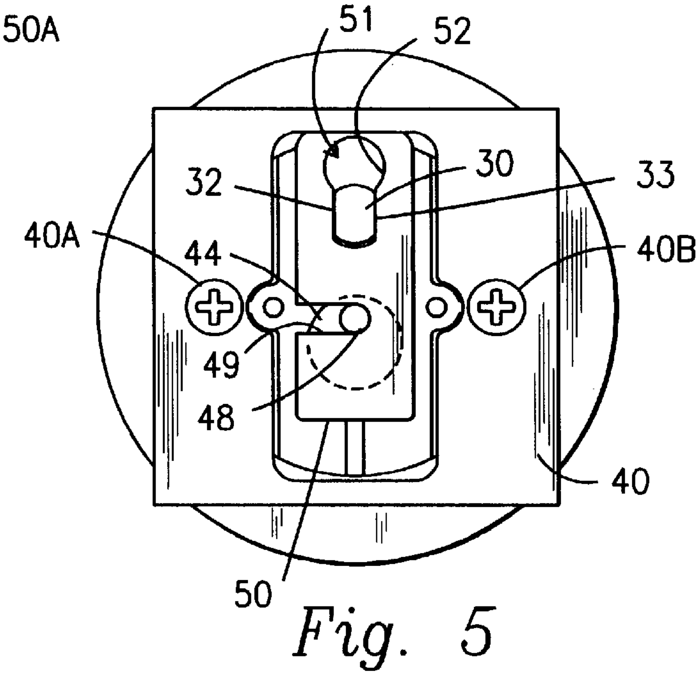
FIG. 5 is a view taken like FIG. 4 with the lock cover plate removed showing the latch in its locked position.
Figure 6:
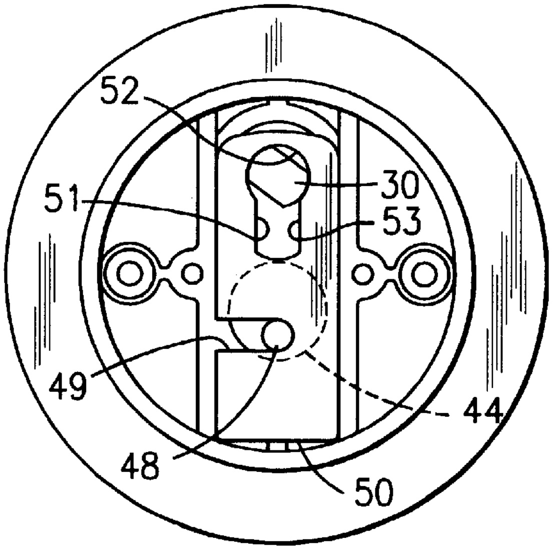
FIG. 6 is a view taken like FIG. 4 showing the latch in its unlocked position and with the lock cover plate and the latch securing plate both removed.
Figure 7:
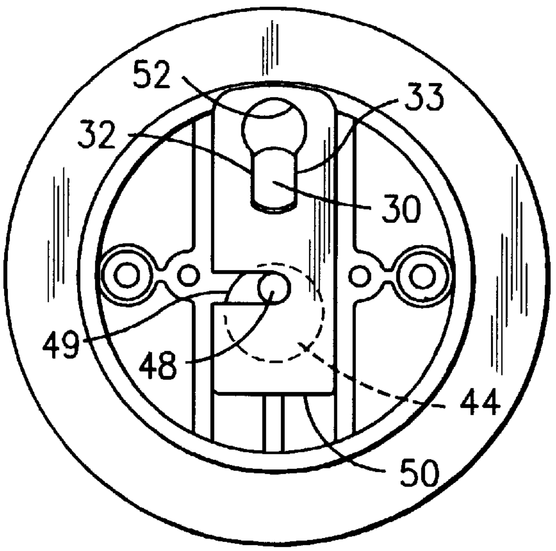
FIG. 7 is a view taken like FIG. 6 showing the latch in its locked position.

The knob shaft 25 is rotatably mounted in an opening 27 formed in the housing 16, and an "O-ring" 28 carried by the shaft 25 immediately below the knob 24 seals against the housing 16 so that no water can flow therepast. A cam shaft 30 is formed integrally with and extends downwardly from the knob shaft 25 so that its lower end 31 projects below the inside of the deck 15. The cam shaft 30 is threaded for its full length and has a pair of diametrically opposed flat surfaces 32 and 33 formed thereon. Referring now to FIGS. 2 and 3 for clarity, a washer 34 is mounted on the cam shaft 30 and abuts a shoulder 35 formed on the housing 16 around the opening 27 therein, and a lock nut 36 is threaded on the shaft 30 securely against the washer 34 to lock the knob shaft 25 securely in housing 16 against vertical movement while allowing the shaft 25 to freely rotate relative to the housing. On the lower end of the cam shaft 30 is mounted a lock bar 37 which has a opening adjacent one end thereof (not shown) receiving the shaft 30 while a pair of lock nuts 38 and 39, disposed on opposed sides of the bar 37 secure the same against movement relative to the shaft 30. Preferably, the opening in the bar 37 has a pair of flats (not shown) thereon in the opening therein (not shown) which register with the flat surfaces 32 and 33 on the shaft 30 to prevent relative rotation.

The locking bar 37 projects perpendicularly from the shaft 30, so that in the secured position of the lift ring 22, the distal end of the bar 37 is disposed below the deck 15 to prevent upward movement of the hatch cover 14 relative to the deck. Upon raising the ring 22, the ring can rotate the knob 24 one hundred and eighty degrees thereby completely moving the bar 37 from engagement with the deck 15. In this position, the ring 22 can be used to raise the hatch cover 14. Since the knob 24 has been rotated one hundred and eighty degrees, the ring 22 can again be lowered and received in the groove 23. A securing plate 40 has an opening 42 therein which receives the lower part of the housing 16 so that the plate 40 abuts a shoulder 41 on the housing and also abuts the underside of the hatch cover 14 to securely mount the housing 16 and the hatch cover 14. A pair of screws 40A and 40B secure the plate 40 to the bottom of the housing 16.

Locking means, shown generally at 43, are provided to lock the knob 24 and the cam shaft 30 alternately in their "locked" position, with the lock bar 37 under the deck 15 as seen in FIG. 2 or to lock the lock bar in a position one hundred and eighty degrees from such position in its "unlocked position".

The locking means 43 includes a key actuated tumbler 44 which is sealingly pressed into an opening 45 and retained therein by a snap ring 46 engaged in a groove in the tumbler 44 and a registering groove in the housing 16. The tumbler 44 has a key slot 47 therein which, when the key is removed therefrom, has a spring loaded cover which seals the opening against water leaking therepast. Such a tumbler can be obtained from the Hurd Lock Corp. of 603 Bohannon Avenue, Greenville, Tenn. 37744-1450 under Part Number 2400030000. The lower end of the tumbler has an eccentric pin 48 thereon which engages in a transverse slot 49 in a slide plate 50. Rotation of the tumbler 44 causes the eccentric pin 48 to move the slide plate 50 for and aft. An opening shown generally at 51 in the rear end of the slide plate 50 has an enlarged round end 52 which at the inner end thereof blends into a flat sided slot 53. When the bar 37 is disposed below the deck 15, or one hundred and eighty degrees therefrom, the flat surfaces 32 and 33 are aligned with the flat sides of the opening 53 and the slide plate 50 can be moved by the pin 48 so that the flat sides of opening 53 engage the flat surfaces 32 and 33 of cam shaft 30 to prevent rotation of the cam shaft 30, whereby the bar 37 is locked into its "locked" or unlocked position. Activation of the tumbler 44 to move the pin 48 and thereby the slide plate 50 so that the round end 52 of the opening 51 receives the cam shaft 30, allows the knob 24 to rotate the cam shaft such that the bar 37 may be moved to any position around its circumventual plane of movement, but preferably to either its "locked" or "unlocked" position. Once the bar 37 is in its locked or unlocked position, the ring 22 can be lowered into the groove 23 and the key (not shown) removed from the tumbler 44. A cover plate 50A overlies the slide plate 50 and is secured to the housing 16 by mounting screws 50B, so that the cover plate holds the slide plate in place while allowing operative movement thereof.

Figure 8:
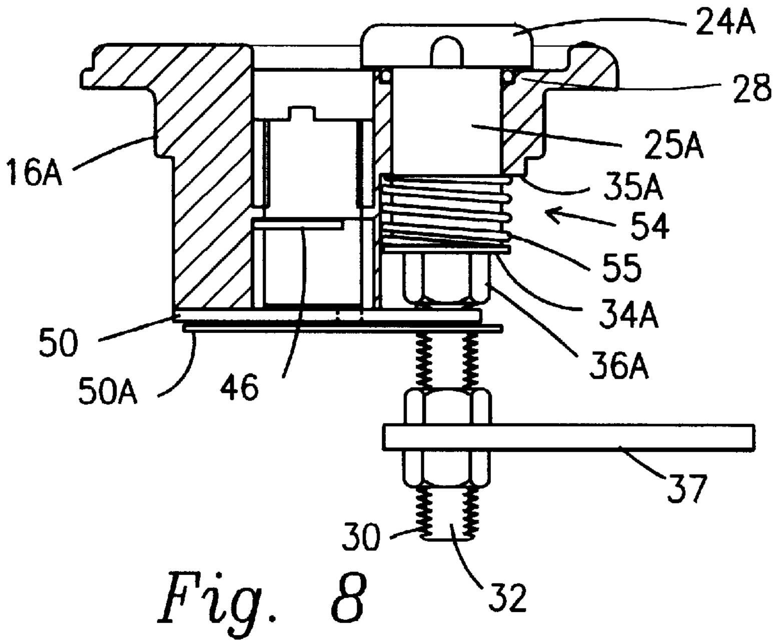
FIG. 8 is a view taken like FIG. 3 of a second embodiment of this invention.

In the event that the ring 22 is lowered at such time that the knob 24 is positioned so that the bar 37 is not fully locked or unlocked, the ring 22 will not register with the groove 23 and will be held up by the surface of the housing 16 adjacent the groove 23. To prevent inadvertent damage to the ring 22 at such time, reference is made to the embodiment of FIG. 8, wherein resilient means 54 has been provided to inhibit shock loading or bending of the ring 22. More particularly, a coiled compression spring 55 is received around the knob shaft 25A and it top end abuts against a shoulder 35A on the housing 16A, while a lock nut 36A engages a washer 34A which, in turn, engages the bottom end of the spring 55. Thus the knob 24A is resiliently held in place in the housing 16A by the resilient means 54, and in the event of the ring 22 is inadvertently stepped on while the ring is not in the groove 23, the resilient means 54 will allow the knob 24A to move axially and prevent the ring 22 from bending or breaking. When the ring 22 is not in the groove 23, the top surface of the housing 16 adjacent the groove 23 will engage the ring 22 and act as a fulcrum in the event the ring is stepped on. Thus if someone steps on the ring 22 when not in the groove 23 and thus in its intermediate position, the outer end of the ring would be moved downwardly and the inner end, connected to the knob 24A, would be lifted, which moves the knob shaft 24A upwardly and compresses the resilient means 54 and thereby prevents damage to the ring.

Means are provided to indicate the locked status of the hatch latch. Referring to FIG. 1, a bump 56 is positioned on the housing 16 adjacent the knob 24, and a bump 57 is positioned on the knob 24. When the bumps 56 and 57 are adjoining each other as shown, the bar 37 is in its unlocked position and when the bumps are displaced, the bar is unlocked.

What is claimed is:

1. A hatch latch for mounting in a hatch in a waterproof manner, said hatch latch comprising, a) a latch housing having an inner and an outer side and being adapted to be mounted in an opening in a hatch cover and sealed relative thereto, b) a cam member extending through and rotably mounted in said housing for relative rotative and axial movement, c) rotation and axial movement allowing sealing means between said cam member and said housing, d) a locking bar carried by said cam member at a position wherein it will project laterally therefrom beyond a hatch cover to a deck engaging position, e) a lift ring secured to the top end of said cam member at a location above said outer side of said housing, f) said housing having a depression in the outer side thereof adapted to receive said lift ring, g) said lift ring having an upright graspable operative position and a depressed inoperative position wherein it resides in said depression, h) said lift ring and said cam member being rotatable to move said locking bar between a locked position and an unlocked position, i) when said lift ring is in a position intermediate said locked and unlocked positions, said ring can rest on said housing outside of said depression and be subject to being damaged, j) outward movement restraining means carried by said cam member at a location inwardly of said housing to restrain outward movement of said cam member relative to said housing, and k) said restraining means including 1) a compressible resilient means located inwardly of said housing, with said resilient means being configured, disposed, and resiliently constrained for constantly allowing controlled resilient axial outward movement of said cam member and said lift ring for preventing damage to said lift ring when said lift ring is in an intermediate position and a force is applied to said lift ring, 2) and a compressing member carried by said cam member and constantly compressing said resilient means at all times between said compressing member and said inner side of said housing.

2. A latch according to claim 1, wherein:

a) said resilient means is a coiled compression spring.

3. A latch according to claim 2, wherein:

a) said compressing member is a lock nut threaded on said cam member, and said lock nut compresses said compression spring against the inner side of said housing.

4. A latch according to claim 1 wherein said latch includes a waterproof lock tumbler sealingly secured in said housing for locking said locking bar in its deck engaging position.

* * * * *